US 9,114,362 B2

(12) United States Patent
Zones et al.

(10) Patent No.: US 9,114,362 B2
(45) Date of Patent: Aug. 25, 2015

(54) TREATMENT OF COLD START ENGINE EXHAUST

(71) Applicants: Stacey Ian Zones, San Francisco, CA (US); Tecle S. Rufael, Stafford, TX (US)

(72) Inventors: Stacey Ian Zones, San Francisco, CA (US); Cabral M. Williams, Houston, TX (US); Tecle S. Rufael, Stafford, TX (US); Allen W. Burton, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 189 days.

(21) Appl. No.: 14/038,379

(22) Filed: Sep. 26, 2013

(65) Prior Publication Data

US 2014/0072494 A1 Mar. 13, 2014

Related U.S. Application Data

(63) Continuation of application No. 11/961,776, filed on Dec. 20, 2007, now Pat. No. 8,580,228.

(60) Provisional application No. 60/882,081, filed on Dec. 27, 2006.

(51) Int. Cl.
*B01J 29/80* (2006.01)
*B01J 29/00* (2006.01)
(Continued)

(52) U.S. Cl.
CPC .............. *B01D 53/945* (2013.01); *B01D 53/04* (2013.01); *B01D 53/9486* (2013.01); *B01J 29/80* (2013.01); *B01D 2253/104* (2013.01); *B01D 2253/108* (2013.01); *B01D 2255/102* (2013.01); *B01D 2255/1021* (2013.01);

(Continued)

(58) Field of Classification Search
None
See application file for complete search history.

(56) References Cited

U.S. PATENT DOCUMENTS 2,942,932 A 6/1960 Elliott
3,208,200 A 9/1965 Gant et al.
(Continued)

FOREIGN PATENT DOCUMENTS

CA 1205980 5/1961
EP 0914864 5/1999
(Continued)

OTHER PUBLICATIONS

Elangovan et al., Journal of Physical Chemistry B. 108, 13059-13061 (2004).
(Continued)

*Primary Examiner* — Melvin C Mayes
*Assistant Examiner* — Sheng H Davis
(74) *Attorney, Agent, or Firm* — E. Joseph Gess; Terrence Flaherty; Melissa M. Hayworth

(57) ABSTRACT

The present invention relates to a process for reducing cold start emissions in an exhaust gas stream by contacting the exhaust stream with a combination of molecular sieves comprising (1) a small pore crystalline molecular sieve or mixture of molecular sieves having pores no larger than 8 membered rings selected from the group consisting of SSZ-13, SSZ-16, SSZ-36, SSZ-39, SSZ-50, SSZ-52 and SSZ-73 and (2) a medium-large pore crystalline molecular sieve having pores at least as large as 10 membered rings selected from the group consisting of SSZ-26, SSZ-33, SSZ-64, zeolite Beta, CIT-1, CIT-6 and ITQ-4.

25 Claims, 3 Drawing Sheets

(51) Int. Cl.
  *B01J 35/00* (2006.01)
  *B01D 53/94* (2006.01)
  *B01D 53/04* (2006.01)
  *B01J 29/70* (2006.01)

(52) U.S. Cl.
  CPC .... *B01D 2255/1023* (2013.01); *B01D 2255/50* (2013.01); *B01D 2259/4143* (2013.01); *B01J 29/70* (2013.01); *B01J 29/7007* (2013.01); *Y02C 20/20* (2013.01); *Y02T 10/22* (2013.01)

(56) References Cited

U.S. PATENT DOCUMENTS

| | | |
|---|---|---|
| 3,308,089 A | 3/1967 | Wadlinger et al. |
| 3,699,683 A | 10/1972 | Tourtellotte et al. |
| 3,767,453 A | 10/1973 | Hoekstra |
| 3,785,998 A | 1/1974 | Hoekstra |
| RE28,341 E | 2/1975 | Wadlinger et al. |
| 3,920,583 A | 11/1975 | Pugh |
| 4,528,279 A | 7/1985 | Suzuki et al. |
| 4,544,538 A | 10/1985 | Zones |
| 4,760,044 A | 7/1988 | Joy, III et al. |
| 4,791,091 A | 12/1988 | Bricker et al. |
| 4,868,148 A | 9/1989 | Henk et al. |
| 4,868,149 A | 9/1989 | Bricker |
| 4,910,006 A | 3/1990 | Zones |
| 4,963,337 A | 10/1990 | Zones |
| 5,078,979 A | 1/1992 | Dunne |
| 5,512,267 A | 4/1996 | Davis et al. |
| 5,603,216 A | 2/1997 | Guile et al. |
| 5,662,869 A | 9/1997 | Abe et al. |
| 5,744,103 A | 4/1998 | Yamada et al. |
| 5,939,044 A | 8/1999 | Nakagawa et al. |
| 5,958,370 A | 9/1999 | Zones et al. |
| 6,117,411 A | 9/2000 | Takewaki et al. |
| 6,254,849 B1 | 7/2001 | Lee et al. |
| 6,569,401 B1 | 5/2003 | Elomari |
| 6,605,267 B1 | 8/2003 | Lee et al. |
| 7,033,969 B1 | 4/2006 | Jobson et al. |
| 7,138,099 B1 | 11/2006 | Zones et al. |
| 2001/0002988 A1 | 6/2001 | Noda et al. |
| 2005/0124486 A1 | 6/2005 | Tran et al. |
| 2005/0166581 A1 | 8/2005 | Davis et al. |
| 2006/0115400 A1 | 6/2006 | Yuen et al. |
| 2006/0115403 A1 | 6/2006 | Yuen et al. |
| 2006/0228283 A1 | 10/2006 | Malyala et al. |
| 2008/0295691 A1 | 12/2008 | Liu et al. |

FOREIGN PATENT DOCUMENTS

| | | |
|---|---|---|
| JP | 5059941 | 3/1993 |
| JP | 2008521744 | 6/2008 |
| WO | 2005092482 | 10/2005 |

OTHER PUBLICATIONS

R. Castaneda, et al., Synthesis of a New Zeolite Structure ITQ-24 with Interesting 10- and 12- Membered Ring Pores, J. Am. Chem. Soc., 125, 7820-7821 (203), 2003.

TREATMENT OF COLD START ENGINE EXHAUST

This application is a continuation of U.S. application Ser. No. 11/961,776 filed Dec. 20, 2007, entitled "Treatment of Cold Start Engine Exhaust", now issued as U.S. Pat. No. 8,580,228, which claims benefit under 35 U.S.C. §119 of Provisional Application No. 60/882,081 filed Dec. 27, 2006, the contents of which are incorporated herein by reference in their entirety.

FIELD OF THE INVENTION

The present invention relates to the treatment of cold start engine exhaust using certain zeolites having different pore sizes.

BACKGROUND

Gaseous waste products resulting from the combustion of hydrocarbonaceous fuels, such as gasoline and fuel oils, comprise carbon monoxide, hydrocarbons and nitrogen oxides as products of combustion or incomplete combustion, and pose a serious health problem with respect to pollution of the atmosphere. While exhaust gases from other carbonaceous fuel-burning sources, such as stationary engines, industrial furnaces, etc., contribute substantially to air pollution, the exhaust gases from automotive engines are a principal source of pollution. Because of these health problem concerns, the Environmental Protection Agency (EPA) has promulgated strict controls on the amounts of carbon monoxide, hydrocarbons and nitrogen oxides which automobiles can emit. The implementation of these controls has resulted in the use of catalytic converters to reduce the amount of pollutants emitted from automobiles.

In order to achieve the simultaneous conversion of carbon monoxide, hydrocarbon and nitrogen oxide pollutants, it has become the practice to employ catalysts in conjunction with air-to-fuel ratio control means which functions in response to a feedback signal from an oxygen sensor in the engine exhaust system. Although these three component control catalysts work quite well after they have reached operating temperature of about 300° C., at lower temperatures they are not able to convert substantial amounts of the pollutants. What this means is that when an engine and in particular an automobile engine is started up, the three component control catalyst is not able to convert the hydrocarbons and other pollutants to innocuous compounds.

Adsorbent beds have been used to adsorb the hydrocarbons during the cold start portion of the engine. Although the process typically will be used with hydrocarbon fuels, adsorbent beds can also be used to treat exhaust streams from alcohol fueled engines. The adsorbent bed is typically placed immediately before the catalyst. Thus, the exhaust stream is first flowed through the adsorbent bed and then through the catalyst. The adsorbent bed preferentially adsorbs hydrocarbons over water under the conditions present in the exhaust stream. After a certain amount of time, the adsorbent bed has reached a temperature (typically about 150° C.) at which the bed is no longer able to remove hydrocarbons from the exhaust stream. That is, hydrocarbons are actually desorbed from the adsorbent bed instead of being adsorbed. This regenerates the adsorbent bed so that it can adsorb hydrocarbons during a subsequent cold start.

The prior art reveals several references dealing with the use of adsorbent beds to minimize hydrocarbon emissions during a cold start engine operation. One such reference is U.S. Pat. No. 3,699,683 in which an adsorbent bed is placed after both a reducing catalyst and an oxidizing catalyst. The patentees disclose that when the exhaust gas stream is below 200° C. the gas stream is flowed through the reducing catalyst then through the oxidizing catalyst and finally through the adsorbent bed, thereby adsorbing hydrocarbons on the adsorbent bed. When the temperature goes above 200° C. the gas stream which is discharged from the oxidation catalyst is divided into a major and minor portion, the major portion being discharged directly into the atmosphere and the minor portion passing through the adsorbent bed whereby unburned hydrocarbon is desorbed and then flowing the resulting minor portion of this exhaust stream containing the desorbed unburned hydrocarbons into the engine where they are burned.

Another reference is U.S. Pat. No. 2,942,932 which teaches a process for oxidizing carbon monoxide and hydrocarbons which are contained in exhaust gas streams. The process disclosed in this patent consists of flowing an exhaust stream which is below 800° F. into an adsorption zone which adsorbs the carbon monoxide and hydrocarbons and then passing the resultant stream from this adsorption zone into an oxidation zone. When the temperature of the exhaust gas stream reaches about 800° F. the exhaust stream is no longer passed through the adsorption zone but is passed directly to the oxidation zone with the addition of excess air.

U.S. Pat. No. 5,078,979, issued Jan. 7, 1992 to Dunne, which is incorporated herein by reference in its entirety, discloses treating an exhaust gas stream from an engine to prevent cold start emissions using a molecular sieve adsorbent bed. Examples of the molecular sieve include faujasites, clinoptilolites, mordenites, chabazite, silicalite, zeolite Y, ultrastable zeolite Y, and ZSM-5.

Canadian Patent No. 1,205,980 discloses a method of reducing exhaust emissions from an alcohol fueled automotive vehicle. This method consists of directing the cool engine startup exhaust gas through a bed of zeolite particles and then over an oxidation catalyst and then the gas is discharged to the atmosphere. As the exhaust gas stream warms up it is continuously passed over the adsorption bed and then over the oxidation bed.

U.S. Pat. No. 5,744,103, issued Apr. 28, 1998 to Yamada et al., discloses a hydrocarbon adsorbent for engine exhaust gas cleaning. The adsorbent contains large pore zeolites having 12+ membered rings ("MR"), smaller pore zeolites having 8 MR and in-between pore zeolites having 10 MR. Disclosed examples of the zeolites are those having the topologies (as identified by the International Zeolite Association ("IZA")) FAU (e.g., zeolite Y), AFY and Beta (i.e., 12 MR zeolites); CHA (8 MR); and MFI (e.g., ZSM-5), MEL and FER (10 MR).

U.S. Pat. No. 5,603,216, issued Feb. 18, 1997 to Guile et al., discloses reducing the amount of hydrocarbons emitted during engine start (cold start) using two zones in the exhaust system using the same or different zeolite adsorber(s) in each zone. The zeolite(s) may be small pore zeolite which adsorbs low molecular weight alkenes (ethylene and propylene) and large pore zeolite which adsorb higher molecular weight hydrocarbons (e.g., pentane). Disclosed examples of zeolites are ZSM-5, Beta, gmelinite, mazzite, offretite, ZSM-12, ZSM-18, Berryllophosphate-H, boggsite, SAPO-40, SAPO-41, Ultrastable Y, mordenite and combinations thereof.

Elangovan et al., *Journal of Physical Chemistry B*, 108, 13059-13061 (2004) discloses the zeolite designated SSZ-33 (a zeolite having intersecting 10 and 12 MR pores with a large void at the intersections) for use as a hydrocarbon trap to reduce cold start emissions. The performance of the SSZ-33 is compared to that of Beta, Y, mordenites and ZSM-5 zeolites. SSZ-33 is said to have superior performance over Beta, Y, mordenites or ZSM-5.

U.S. Patent Application Publication 2005/0166581, published Aug. 4, 2005 by Davis et al., discloses molecular sieves used as adsorbents in hydrocarbon traps for engine exhaust. The method comprises contacting the exhaust gas with molecular sieves having the CON topology (per the IZA). The CON molecular sieve can be used by itself or can be used with another adsorbent. Disclosed examples of CON molecular sieves are those designated SSZ-33, SSZ-26, and CIT-1. ITQ-4 is also disclosed, but it is believed ITQ-4 has the IFR topology, not the CON topology. Disclosed examples of the other adsorbent are molecular sieves designated SSZ-23, SSZ-31, SSZ-35, SSZ-41, SSZ-42, SSZ-43, SSZ-44, SSZ-45, SSZ-47, SSZ-48, SSZ-53, SSZ-55, SSZ-57, SSZ-58, SSZ-59, SSZ-60, SSZ-63, SSZ-64, SSZ-65 and mixtures thereof.

SUMMARY OF THE INVENTION

This invention generally relates to a process for treating an engine exhaust stream and in particular to a process for minimizing emissions during the cold start operation of an engine. Accordingly, the present invention provides a process for treating a cold-start engine exhaust gas stream containing hydrocarbons and other pollutants consisting of flowing said engine exhaust gas stream over a combination of molecular sieves which preferentially adsorbs the hydrocarbons over water to provide a first exhaust stream, and flowing the first exhaust gas stream over a catalyst to convert any residual hydrocarbons and other pollutants contained in the first exhaust gas stream to innocuous products and provide a treated exhaust stream and discharging the treated exhaust stream into the atmosphere, the combination of molecular sieves comprising (1) a small pore crystalline molecular sieve or mixture of molecular sieves having pores no larger than 8 membered rings ("8 MR") selected from the group consisting of SSZ-13, SSZ-16, SSZ-36, SSZ-39, SSZ-50, SSZ-52 and SSZ-73 and having a mole ratio of at least 10 of (a) an oxide of a first tetravalent element to (b) an oxide of a trivalent element, pentavalent element, second tetravalent element which is different from said first tetravalent element or mixture thereof and (2) a medium-large pore crystalline molecular sieve having pores at least as large as 10 membered rings ("10 MR") selected from the group consisting of SSZ-26, SSZ-33, SSZ-64, zeolite Beta, CIT-1, CIT-6 and ITQ-4 and having a mole ratio of at least 10 of (a) an oxide of a first tetravalent element to (b) an oxide of a trivalent element, pentavalent element, second tetravalent element which is different from said first tetravalent element or mixture thereof. The present invention also provides such a process wherein oxides (1)(a) and (2)(a) are silicon oxide, and oxides (1)(b) and (2)(b) are independently selected from aluminum oxide, gallium oxide, iron oxide, boron oxide, titanium oxide, indium oxide, zinc oxide, magnesium oxide, cobalt oxide and mixtures thereof. In one embodiment, molecular sieve (1) is SSZ-13, SSZ-39 or mixtures thereof and molecular sieve (2) is SSZ-26, SSZ-33, CIT-1, Beta, CIT-6 or mixtures thereof. In another embodiment, molecular sieve (1), molecular sieve (2) or both contain a metal selected from Cu, Ag, Au or mixtures thereof.

The present invention further provides such a process wherein the engine is an internal combustion engine, including automobile engines, which can be fueled by a hydrocarbonaceous fuel.

Also provided by the present invention is such a process wherein the molecular sieve has deposited on it a metal selected from the group consisting of platinum, palladium, rhodium, ruthenium, and mixtures thereof.

BRIEF DESCRIPTION OF THE DRAWINGS

FIG. 1 illustrates zeolite methane adsorption at 30° C.
FIG. 2 illustrates zeolite ethane adsorption at 30° C.
FIG. 3 illustrates zeolite ethylene adsorption at 30° C.

DETAILED DESCRIPTION OF THE INVENTION

Figure 1:
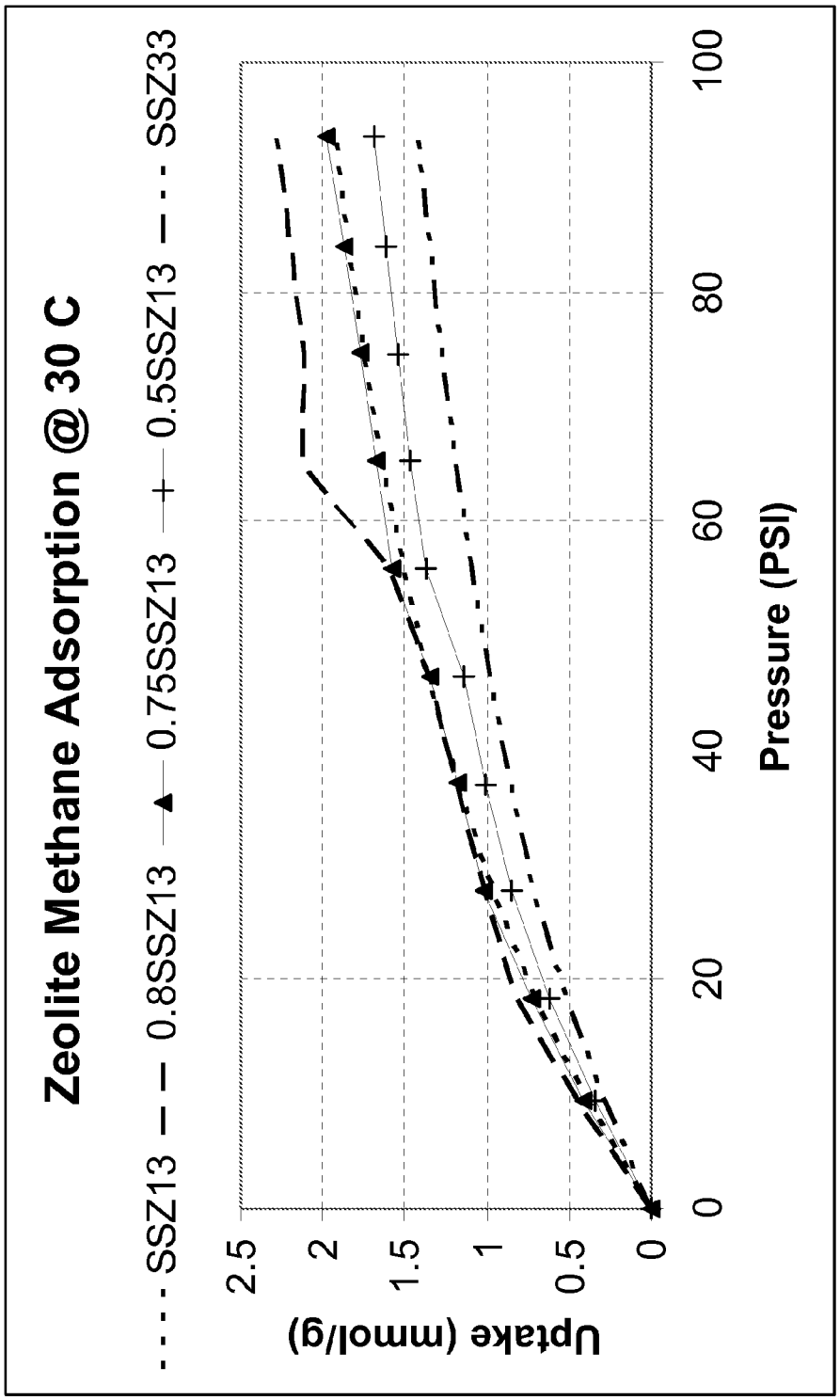
FIGS. 1-3 illustrate data comparing the adsorptive properties of zeolites with the adsorptive properties of mixtures of zeolites according to the present invention.

As stated, this invention generally relates to a process for treating an engine exhaust stream and in particular to a process for minimizing emissions during the cold start operation of an engine. The engine consists of any internal or external combustion engine which generates an exhaust gas stream containing noxious components or pollutants including unburned or thermally degraded hydrocarbons or similar organics. Other noxious components usually present in the exhaust gas include nitrogen oxides and carbon monoxide. The engine may be fueled by a hydrocarbonaceous fuel. As used in this specification and in the appended claims, the term "hydrocarbonaceous fuel" includes hydrocarbons, alcohols and mixtures thereof. Examples of hydrocarbons which can be used to fuel the engine are the mixtures of hydrocarbons which make up gasoline or diesel fuel. The alcohols which may be used to fuel engines include ethanol and methanol. Mixtures of alcohols and mixtures of alcohols and hydrocarbons can also be used. The engine may be a jet engine, gas turbine, internal combustion engine, such as an automobile, truck or bus engine, a diesel engine or the like. The process is particularly suited for hydrocarbon, alcohol, or hydrocarbon-alcohol mixture, internal combustion engine mounted in an automobile. For convenience the description will use hydrocarbon as the fuel to exemplify the invention. The use of hydrocarbon in the subsequent description is not to be construed as limiting the invention to hydrocarbon fueled engines.

When the engine is started up, it produces a relatively high concentration of hydrocarbons in the engine exhaust gas stream as well as other pollutants. Pollutants will be used herein to collectively refer to any unburned fuel components and combustion byproducts found in the exhaust stream. For example, when the fuel is a hydrocarbon fuel, hydrocarbons, nitrogen oxides, carbon monoxide and other combustion byproducts will be found in the engine exhaust gas stream. The temperature of this engine exhaust stream is relatively cool, generally below 500° C. and typically in the range of 200° to 400° C. This engine exhaust stream has the above characteristics during the initial period of engine operation, typically for the first 30 to 120 seconds after startup of a cold engine. The engine exhaust stream will typically contain, by volume, about 500 to 1000 ppm hydrocarbons.

The engine exhaust gas stream which is to be treated is flowed over a combination of molecular sieves in a first exhaust stream. The combination of molecular sieves is described below. The first exhaust stream which is discharged from the molecular sieve combination is now flowed over a catalyst to convert the pollutants contained in the first exhaust stream to innocuous components and provide a treated exhaust stream which is discharged into the atmosphere. It is understood that prior to discharge into the atmosphere, the treated exhaust stream may be flowed through a muffler or other sound reduction apparatus well known in the art.

The catalyst which is used to convert the pollutants to innocuous components is usually referred to in the art as a three-component control catalyst because it can simultaneously oxidize any residual hydrocarbons present in the first exhaust stream to carbon dioxide and water, oxidize any residual carbon monoxide to carbon dioxide and reduce any residual nitric oxide to nitrogen and oxygen. In some cases the catalyst may not be required to convert nitric oxide to nitrogen and oxygen, e.g., when an alcohol is used as the fuel. In this case the catalyst is called an oxidation catalyst. Because of the relatively low temperature of the engine exhaust stream and the first exhaust stream, this catalyst does not function at a very high efficiency, thereby necessitating the molecular sieve adsorbent.

When the molecular sieve adsorbent reaches a sufficient temperature, typically about 150-200° C., the pollutants which are adsorbed in the molecular sieve(s) begin to desorb and are carried by the first exhaust stream over the catalyst. At this point the catalyst has reached its operating temperature and is therefore capable of fully converting the pollutants to innocuous components.

The adsorption capacity of a molecular sieve depends on the size of the hydrocarbon molecule (thus, its molecular weight and shape). For example, when a molecular sieve having a smaller pore diameter (such as an eight MR pore) is used, the hydrocarbons having higher molecular weights (such as paraffins, olefins or aromatic compounds having at least six carbon atoms) may not be adsorbed. To the contrary, when a molecular sieve having a medium-large pore opening diameter (such as a twelve and/or ten MR pore) is used, hydrocarbons having lower molecular weights (such as methane, propane or propylene) is desorbed at a lower than desired temperature, so that it is difficult to keep such a hydrocarbon in the pores of the medium-large pore molecular sieve until the noble metal becomes of sufficiently high temperature to be activated.

The molecular sieve adsorbent used in the present invention comprises a combination or mixture of molecular sieves containing (1) a molecular sieve or mixture of molecular sieves having pores no larger than 8 membered rings ("8 MR") selected from the group consisting of SSZ-13, SSZ-16, SSZ-36, SSZ-39, SSZ-50, SSZ-52 and SSZ-73 and having a mole ratio of at least 10 of (a) an oxide of a first tetravalent element to (b) an oxide of a trivalent element, pentavalent element, second tetravalent element which is different from said first tetravalent element or mixture thereof and (2) a medium-large pore crystalline molecular sieve having pores at least as large as 10 membered rings ("10 MR") selected from the group consisting of SSZ-26, SSZ-33, SSZ-64, zeolite Beta, CIT-1, CIT-6 and ITQ-4 and having a mole ratio of at least 10 of (a) an oxide of a first tetravalent element to (b) an oxide of a trivalent element, pentavalent element, second tetravalent element which is different from said first tetravalent element or mixture thereof.

The small pore molecular sieves of this invention have (2-dimensional or 3-dimensional) intersecting channels. Examples of such molecular sieves include the following, where the three letter structure code, number of members in the pore ring(s) and channel configuration are from the International Zeolite Association database:

Molecular sieve designated SSZ-13 (CHA) disclosed in U.S. Pat. No. 4,544,538, issued Oct. 1, 1985 to Zones.

Molecular sieve designated SSZ-16 (AFX, (8 6 4), 3D) disclosed in U.S. Pat. No. 5,958,370, issued Sep. 28, 1999 to Zones et al.

Molecular sieve designated SSZ-36 (ITE-RTH structural intermediate), disclosed in U.S. Pat. No. 5,939,044, issued Aug. 17, 1999 to Nakagawa et al.

Molecular sieve designated SSZ-39 (AEI, (8 6 4), 3D), disclosed in U.S. Pat. No. 5,958,370, issued Sep. 28, 1999.

Molecular sieve designated SSZ-50 (RTH, (8 6 5 4), 2D), disclosed in U.S. Pat. No. 6,605,267, issued Aug. 12, 2003.

Molecular sieve designated SSZ-52, disclosed in U.S. Pat. No. 6,254,849, issued Jul. 3, 2001.

Molecular sieve designated SSZ-73, disclosed in U.S. Pat. No. 7,138,099, issued Nov. 21, 2006.

The aforementioned patents cited to identify the small pore molecular sieves useful in this invention are incorporated herein by reference in their entirety.

The small pore molecular sieves listed above fulfill the criteria for use in the present invention of having large micropore volumes and high ratios of oxide(s) (1), e.g., silica, to oxide(s) (2), e.g., alumina (referred to herein as "high silica" molecular sieves). These two features distinguish these small pore molecular sieves from molecular sieves used in the prior art wherein the small pore molecular sieves contained large aluminum contents. This latter feature renders them much more sensitive to collapse (sensitivity to steam under operating conditions) than the high silica, small pore molecular sieves of this invention.

The medium-large pore molecular sieves useful in this invention have (2-dimensional or 3-dimensional) intersecting channels. The medium-large pore molecular sieves should have a high internal pore volume (e.g., a nitrogen adsorption capacity of about 0.18 cc/gm or higher). Examples of such molecular sieves include the following, where the three letter structure code, number of members in the pore ring(s) and channel configuration are from the International Zeolite Association database:

Molecular sieve designated SSZ-26 (CON), disclosed in U.S. Pat. No. 4,910,006, issued Mar. 20, 1990 to Zones et al.

Molecular sieve designated SSZ-33 (CON), disclosed in U.S. Pat. No. 4,963,337, issued Oct. 16, 1990 to Zones.

Molecular sieve designated SSZ-64, disclosed is U.S. Pat. No. 6,569,401, issued May 27, 2003 to Elomari. SSZ-64 is believed to have a disordered structure with at least one 12 MR in the structure and a micropore volume that exceeds 0.20 cc/g.

Molecular sieve designated zeolite Beta (*BEA), disclosed in U.S. Pat. No. 3,308,069, issued Mar. 7, 1967 to Wadlinger et al., and Re. 28,341, reissued Feb. 18, 1975 to Wadlinger et al.

Molecular sieve designated CIT-1 (CON), disclosed in U.S. Pat. No. 5,512,267, issued Apr. 30, 1996 to Davis et al.

Molecular sieve designated CIT-6 (*BEA), disclosed in U.S. Pat. No. 6,117,411, issued Sep. 12, 200 to Takewaki et al.

Molecular sieve designated ITQ-24 (IWR), disclosed in R. Castaneda et al., Synthesis of a New Zeolite Structure ITQ-24 with Interesting 10- and 12-Membered Ring Pores, *J. Am. Chem. Soc.*, 125, 7820-7821 (203).

The aforementioned patents and literature article identifying the medium-large pore molecular sieves used in the present invention are incorporated herein by reference in their entirety.

The molecular sieves may comprise a framework heteroatom such as Al, B, Ga, Fe, Zn, Mg, Co and mixtures thereof in addition to Si. The molecular sieves may also contain a metal cation selected from rare earth, Group 2 metals, Groups 8-10 metals and mixtures thereof, e.g., the metal cation may be selected from Mn, Ca, Mg, Zn, Cd, Pt, Pd, Ni, Co, Ti, Al, Sn, Fe, Co and mixtures thereof. The molecular sieves may also contain a metal selected from Cu, Ag, Au and mixtures thereof. The molecular sieves may also include other partial replacement atoms for Si such as Ge. Techniques for replacing Si with Ge are known in the art (see, for example, U.S. Pat. Nos. 4,910,006 and 4,963,337).

In one embodiment, the combination of small and medium-large pore molecular sieves is a combination of (1) SSZ-13 and (2) SSZ-26, SSZ-33 or mixtures thereof. In another embodiment, the combination of small and medium-large pore molecular sieves is a combination of (1) SSZ-13 and (2) SSZ-26.

The molecular sieves should be thermally stable to about 700° C., such as in the presence of steam. Steam can remove some metals, such as aluminum from the framework of some zeolites, causing their structure to collapse. Thus, it is important that the molecular sieves used in the present invention be steam stable. If the molecular sieve to be used does contain a metal, such as zinc, in the framework which makes the molecular sieve unstable in a steam environment, that metal can be replaced with an element that makes the molecular sieve steam stable.

If the hydrocarbonaceous fuel undergoes incomplete combustion in the engine, the exhaust gas can contain carbon dioxide and water. The presence of water in the exhaust gas can make some molecular seizes unstable. One way of stabilizing such molecular sieves is to increase the amount of silicon oxide in the molecular sieve. In general, the higher the silicon oxide content, the more hydrophobic the molecular sieve will be, and the more stable it will be in the present of water vapor. Thus, it may be desirable to partially or completely replace some metals (such as zinc) in the framework of the molecular sieve with silicon to increase hydrophobicity. In some cases, molecular sieves containing all-silicon oxide may be desirable.

The small pore molecular sieve(s) and the medium-large pore molecular sieve(s) of this invention are used in combination to treat a cold-start engine exhaust gas stream. As used herein, the term "combination" means that the cold-start engine exhaust gas stream is contacted with both the small pore molecular sieve(s) of this invention and the medium-large pore molecular sieve(s) of this invention prior to the exhaust stream entering the catalytic converter. This can be accomplished in a number of ways. For example, the "combination" may comprise a mixture of the small pore and medium-large pore molecular sieves in, e.g., a single bed. The small and large pore molecular sieves may also be used in separated beds, or in a single bed comprising layers of small pore and medium-large pore molecular sieves. The small and medium-large pore molecular sieves may also be used in a single bed in which the concentration of one, e.g., the small pore molecular sieve(s), is high and the concentration of the medium-large pore molecular sieve(s) is low (possibly as low as zero) at the upstream side of the bed. The concentration of the small and medium-large pore molecular sieves then gradually reverses in the downstream direction such that the concentration of the, e.g., small pore molecular sieve(s) is low (possibly as low as zero) and the concentration of the, e.g., medium-large pore molecular sieve(s) is high at the downstream end of the bed. However, the small and medium-large pore molecular sieves are conveniently disposed in separate, discrete beds. When used as such, it is possible that, in the event one of the beds fouls, only the fouled bed need be replaced, leaving the other bed intact.

The order in which the cold-start exhaust gas contacts the small pore molecular(s) and the medium-large pore molecular sieve(s) may not be critical. However, there may be advantages to contacting the cold start exhaust gas with the small pore molecular sieve(s) prior to contact with the medium-large pore molecular sieve(s). In this configuration, smaller hydrocarbons (e.g., methane, propane and/or propylene) can be adsorbed by the small pore molecular sieves, While the larger hydrocarbons bypass the small pore molecular sieve(s) (because they are too large to fit in the small pores) leaving the medium-large pore molecular sieve(s) free to adsorb the larger hydrocarbons. The opposite configuration (i.e., medium-large pore molecular sieve(s) positioned upstream of the small pore molecular sieve(s)) may be used as well. However, in this case, there is a risk that the smaller hydrocarbons will fill the pores of the medium-large pore molecular sieve(s) and block entry of the larger hydrocarbons. In that event, the larger hydrocarbons may bypass the pore-filled medium-large pore molecular sieve(s) as well as the downstream small pore molecular sieve(s) (which are incapable of adsorbing the larger hydrocarbons) and proceed to the catalytic converter before the catalytic converter's temperature has risen to a temperature sufficient to convert the larger hydrocarbons.

The particular configuration of the combination can take many forms. For instance, the adsorbent bed can be conveniently employed in particulate form or the adsorbent can be deposited onto a solid monolithic carrier. When the particulate form is desired, the adsorbent can be used in the form of powders, pills, pellets, granules, rings, spheres, etc. In the employment of a monolithic form, it is usually most convenient to employ the adsorbent as a thin film or coating deposited on an inert carrier material which provides the structural support for the adsorbent. The inert carrier material can be any refractory material such as ceramic or metallic materials. It is desirable that the carrier material be unreactive with the adsorbent and not be degraded by the gas to which it is exposed. Examples of suitable ceramic materials include sillimanite, petalite, cordierite, mullite, zircon, zircon mullite, spondumene, alumina-titanate, etc. Examples of metallic materials which serve as inert carrier material include metals and alloys as disclosed in U.S. Pat. No. 3,920,583 which are oxidation resistant and are otherwise capable of withstanding high temperatures.

The carrier material can be utilized in any rigid unitary configuration which provides a plurality of pores or channels extending in the direction of gas flow. Conveniently, the configuration may be a honeycomb configuration. The honeycomb structure can be used advantageously in either unitary form, or as an arrangement of multiple modules. The honeycomb structure is usually oriented such that gas flow is generally in the same direction as the cells or channels of the honeycomb structure. For a more detailed discussion of monolithic structures, refer to U.S. Pat. Nos. 3,785,998 and 3,767,453 which are incorporated by reference herein.

The molecular sieve combination can be deposited onto the carrier by any convenient way well known in the art. One convenient method involves preparing a slurry using the molecular sieves which form the combination (either together in a single slurry or separately in different slurries) and coating the monolithic honeycomb carrier with the slurry(ies). The slurry(ies) can be prepared by means known in the art such as combining the appropriate amount of the molecular sieve(s) and a binder with water. This resulting mixture(s) is then blended by using means such as sonification, milling, etc. This slurry(ies) is used to coat a monolithic honeycomb by dipping the honeycomb into the slurry(ies), removing the excess slurry(ies) by draining or blowing out the channels, and heating to about 100° C. If the desired loading of molecular sieve combination is not achieved, the above process may be repeated as many times as required to achieve the desired loading.

Instead of depositing the molecular sieve combination onto a monolithic honeycomb structure, one can take the molecular sieve combination and form it into a monolithic honeycomb structure by means known in the art.

The adsorbent may optionally contain one or more catalytic metals dispersed thereon. The metals which can be dispersed on the adsorbent are the noble metals which consist of platinum, palladium, rhodium, ruthenium, and mixtures thereof. The desired noble metal may be deposited onto the adsorbent, which acts as a support, in any suitable manner well known in the art. One example of a method of dispersing the noble metal onto the adsorbent support involves impregnating the adsorbent support with an aqueous solution of a decomposable compound of the desired noble metal or metals, drying the adsorbent which has the noble metal compound dispersed on it and then calcining in air at a temperature of about 400° to about 500° C. for a time of about 1 to about 4 hours. By decomposable compound is meant a compound which upon heating in air gives the metal or metal oxide. Examples of the decomposable compounds which can be used are set forth in U.S. Pat. No. 4,791,091 which is incorporated by reference. Preferred decomposable compounds are chloroplatinic acid, rhodium trichloride, chloropalladic acid, hexachloroiridate (IV) acid and hexachlororuthenate. It is preferable that the noble metal be present in an amount ranging from about 0.01 to about 4 weight percent of the adsorbent support. Specifically, in the case of platinum and palladium the range is 0.1 to 4 weight percent, while in the case of rhodium and ruthenium the range is from about 0.01 to 2 weight percent.

These catalytic metals are capable of oxidizing the hydrocarbon and carbon monoxide and reducing the nitric oxide components to innocuous products. Accordingly, the adsorbent bed can act both as an adsorbent and as a catalyst.

The catalyst in the catalytic converter may be selected from any three component control or oxidation catalyst well known in the art. Examples of catalysts are those described in U.S. Pat. Nos. 4,528,279; 4,791,091; 4,760,044; 4,868,148; and 4,868,149, which are all incorporated by reference. Preferred catalysts well known in the art are those that contain platinum and rhodium and optionally palladium, while oxidation catalysts usually do not contain rhodium. Oxidation catalysts usually contain platinum and/or palladium metal. These catalysts may also contain promoters and stabilizers such as barium, cerium, lanthanum, nickel, and iron. The noble metals promoters and stabilizers are usually deposited on a support such as alumina, silica, titania, zirconia, alumino silicates, and mixtures thereof with alumina being preferred. The catalyst can be conveniently employed in particulate form or the catalytic composite can be deposited on a solid monolithic carrier with a monolithic carrier being preferred. The particulate form and monolithic form of the catalyst are prepared as described for the adsorbent above.

Example 1

The adsorption characteristics of zeolites were tested for their effectiveness for adsorbing hydrocarbon materials normally found in automobile exhaust streams. The SSZ-13 sample used in these tests had a silica/alumina ratio of 15.6. The SSZ-33 sample used in these tests had a silica/alumina ratio of 14.6.

Approximately 70 milligrams of a sample of zeolite SSZ-13 powder were loaded in turn into a VTI Scientific Instruments GHP-FS Gravimetric Sorption Analyzer. The sample preparation consisted of drying the sample at 350° C. for 300 minutes (or until the sample weight changed by less than 0.005% over a ten-minute period). The sample then was allowed to equilibrate with methane gas at 30° C. and 500 torr pressure for 30 minutes, or until the sample weight changed by less than 0.005% over a fifteen-minute interval. The pressure was then increased at 500 torr intervals up to a maximum of 5000 torr, with the sample being allowed to equilibrate with the methane gas after each pressure increase. At each pressure, the methane adsorption amount was determined by the weight change of the sample.

The method was repeated using a sample of zeolite SSZ-33 powder.

The method was repeated using a physical mixture of zeolite SSZ-13 powder and zeolite SSZ-33 powder.

The methane uptake by the following zeolites and uniform physical mixtures of zeolites, reported in mmole/gram, is plotted in FIG. 1.

| Sample ID | Zeolite |
|---|---|
| SSZ13 | 100% SSZ-13 |
| 0.8SSZ13 | 4:1 weight ratio SSZ-13:SSZ-33 |
| 0.75SSZ13 | 3:1 weight ratio SSZ-13:SSZ-33 |
| 0.5SSZ13 | 1:1 weight ratio SSZ-13:SSZ-33 |
| SSZ33 | 100% SSZ-33 |

The data illustrated in FIG. 1 shows that methane uptake by SSZ-13 at 30° C. was greater on a weight basis than that of SSZ-33. The 1:1 mixture of SSZ-13: SSZ-33 (denoted 0.5SSZ13 in FIG. 1) was intermediate between the methane uptake of the two zeolites alone. However, the 4:1 and 3:1 mixtures of SSZ-13: SSZ-33 (denoted 0.8SSZ13 and 0.75SSZ13, respectively, in FIG. 1) are shown to have a methane uptake which was equal to, or greater than that of SSZ-13 and SSZ-33 alone.

Example 2

Example 1 was repeated using ethane as an adsorbent. The ethane uptake by the following zeolite samples, reported in mmole/gram, is plotted in FIG. 2.

| Sample ID | Zeolite |
|---|---|
| SSZ13 | 100% SSZ-13 |
| 0.5SSZ13 | 1:1 weight ratio SSZ-13:SSZ-33 |
| SSZ33 | 100% SSZ-33 |

Figure 2:
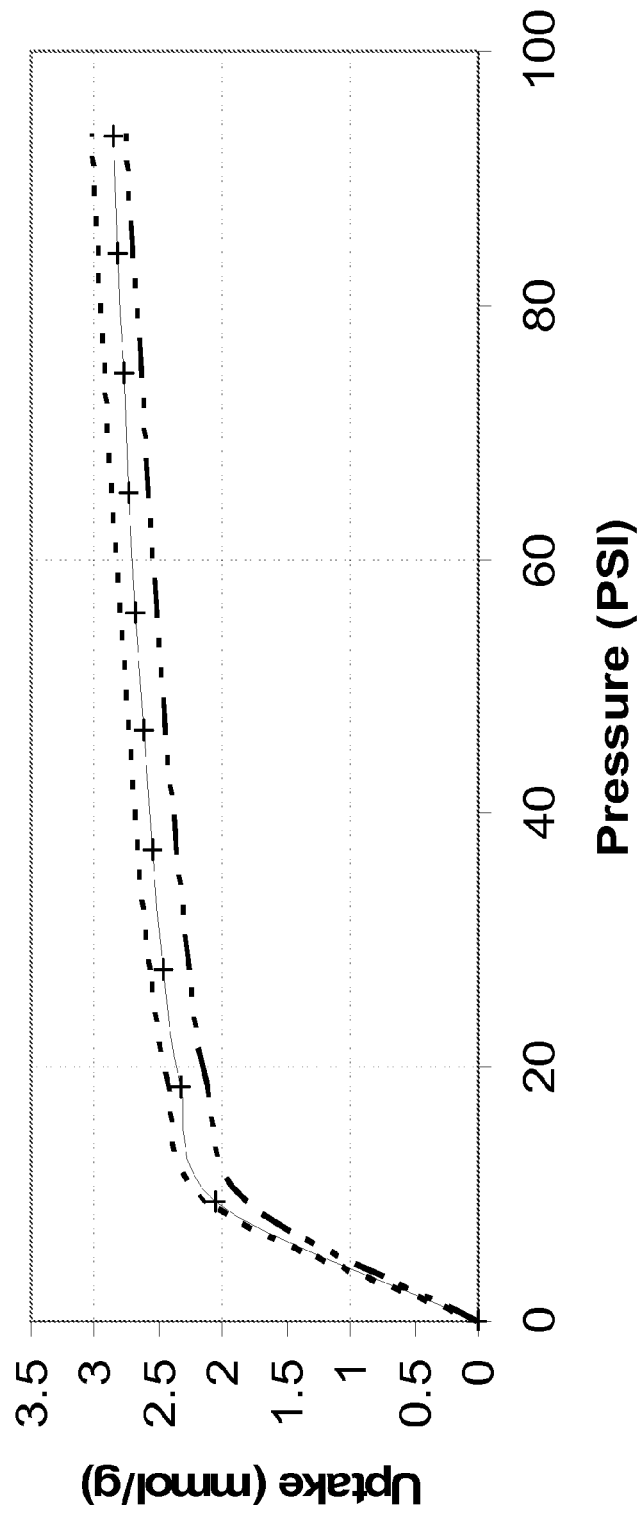

The data illustrated in FIG. 2 shows that the 1:1 mixture of SSZ13:SSZ33 (denoted 0.5SSZ13) had an ethane uptake at 30° C. which was intermediate between that of SSZ-13 and SSZ-33 alone.

Example 3

Example 1 was repeated using ethylene as an adsorbent. The ethylene uptake by the following zeolite samples, reported in mmole/gram, is plotted in FIG. 3.

| Sample ID | Zeolite |
|---|---|
| SSZ13 | 100% SSZ-13 |
| 0.75SSZ13 | 3:1 weight ratio SSZ-13:SSZ-33 |
| 0.5SSZ13 | 1:1 weight ratio SSZ-13:SSZ-33 |
| SSZ33 | 100% SSZ-33 |

Figure 3:
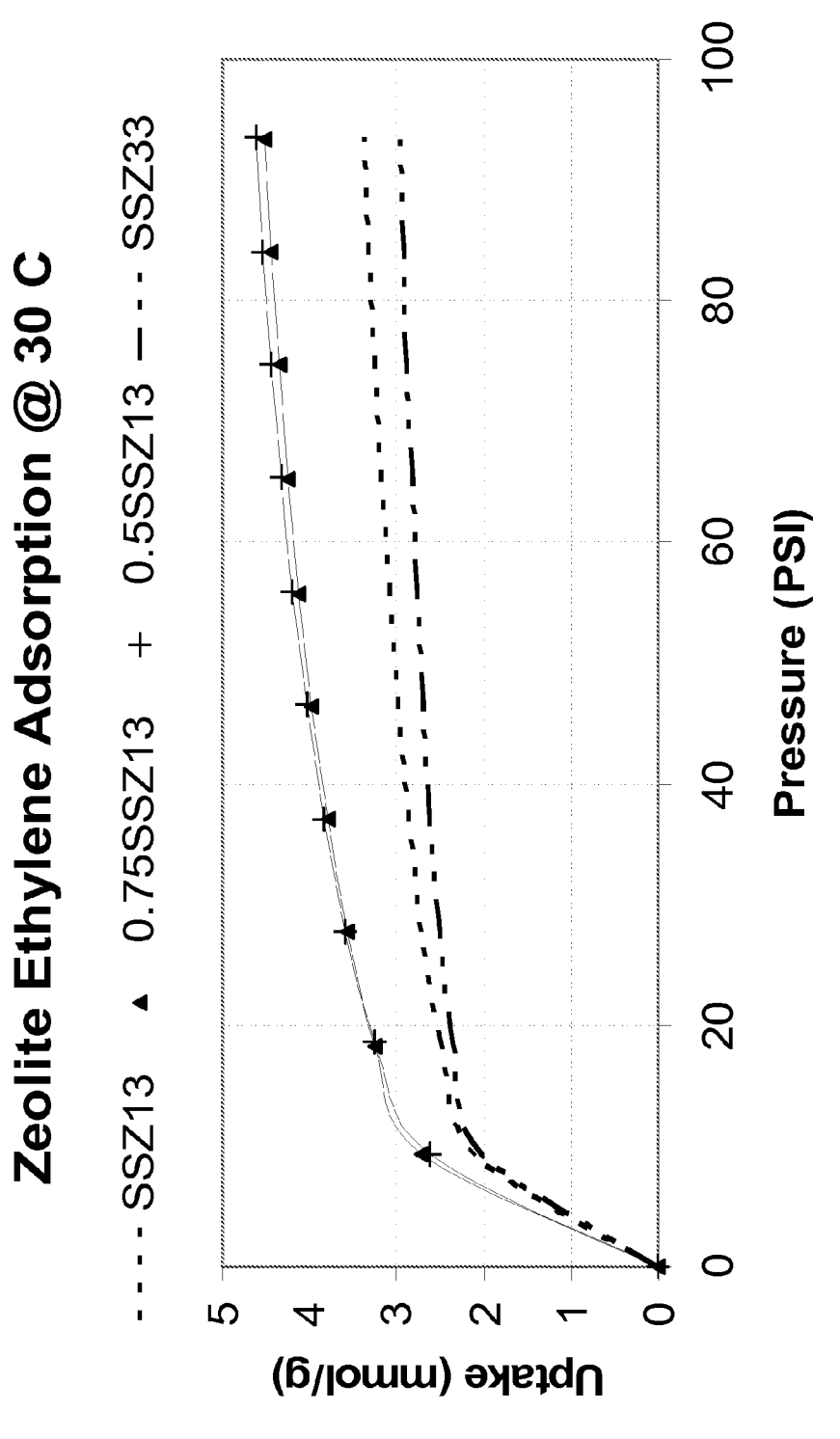

The data illustrated in FIG. 3 show that the 3:1 and 1:1 mixtures of SSZ-13 and SSZ-33 had a much higher ethylene uptake at 30° C. than that of SSZ-13 and SSZ-33 alone.

What is claimed is:

1. A process for treating a cold-start engine exhaust gas stream containing hydrocarbons and other pollutants comprising flowing said engine exhaust gas stream over a combination of molecular sieves which preferentially adsorbs the hydrocarbons over water to provide a first exhaust stream, and flowing the first exhaust gas stream over a catalyst to convert any residual hydrocarbons and other pollutants contained in the first exhaust gas stream to innocuous products and provide a treated exhaust stream and discharging the treated exhaust stream into the atmosphere, the combination of molecular sieves comprising only an oxide (1) having a small pore crystalline molecular sieve selected from the group consisting of SSZ-13, SSZ-16, SSZ-36, SSZ-39, SSZ-50, SSZ-52, SSZ-73 and combinations thereof, and having a mole ratio of at least 10 of (a) an oxide of a first tetravalent element to (b) an oxide of a trivalent element, a pentavalent element, or a second tetravalent element which is different from said first tetravalent element or mixture thereof and an oxide (2) having a crystalline molecular sieve having pores at least as large as 12 membered rings and selected from the group consisting of SSZ-64, zeolite Beta, CIT-1, CIT-6, ITQ-4, and combinations thereof, and having a mole ratio of at least 10 of (a) an oxide of a first tetravalent element to (b) an oxide of a trivalent element, a pentavalent element, or a second tetravalent element which is different from said first tetravalent element or mixture thereof.

2. The process of claim 1, wherein oxides (1)(a) and (2)(a) are silicon oxide, and oxides (1)(b) and (2)(b) are independently selected from aluminum oxide, gallium oxide, iron oxide, boron oxide, titanium oxide, indium oxide, zinc oxide, magnesium oxide, cobalt oxide and mixtures thereof.

3. The process of claim 2, wherein oxides (1)(b) and (2)(b) are aluminum oxide.

4. The process of claim 2, wherein molecular sieve (1) is SSZ-13, SSZ-39 or mixtures thereof and molecular sieve (2) is CIT-1, Beta, CIT-6 or mixtures thereof.

5. The process of claim 2, wherein molecular sieve (1), molecular sieve (2) or both contain a metal selected from Cu, Ag, Au or mixtures thereof.

6. The process of claim 2, wherein the engine is an internal combustion engine.

7. The process of claim 6, wherein the internal combustion engine is an automobile engine.

8. The process of claim 2, wherein the engine is fueled by a hydrocarbonaceous fuel.

9. The process of claim 2, wherein the molecular sieve has deposited on it a metal selected from the group consisting of platinum, palladium, rhodium, ruthenium, and mixtures thereof.

10. The process of claim 9, wherein the metal is platinum.

11. The process of claim 9, wherein the metal is palladium.

12. The process of claim 9, wherein the metal is a mixture of platinum and palladium.

13. The process of claim 1, wherein the cold-start engine exhaust gas stream is contacted with the small pore crystalline molecular sieve prior to contacting the crystalline molecular sieve having pores at least as large as 12 membered rings.

14. A process for treating a cold-start engine exhaust gas stream containing hydrocarbons and other pollutants comprising flowing said engine exhaust gas stream over a combination of molecular sieves which preferentially adsorbs the hydrocarbons over water to provide a first exhaust stream, and flowing the first exhaust gas stream over a catalyst to convert any residual hydrocarbons and other pollutants contained in the first exhaust gas stream to innocuous products and provide a treated exhaust stream and discharging the treated exhaust stream into the atmosphere, the combination of molecular sieves comprising only an oxide (1) having a small pore crystalline molecular sieve selected from the group consisting of SSZ-16, SSZ-36, SSZ-39, SSZ-50, SSZ-52, SSZ-73 and combinations thereof, and having a mole ratio of at least 10 of (a) an oxide of a first tetravalent element to (b) an oxide of a trivalent element, a pentavalent element, or a second tetravalent element which is different from said first tetravalent element or mixture thereof and an oxide (2) having a crystalline molecular sieve having pores at least as large as 12 membered rings and selected from the group consisting of SSZ-26, SSZ-33, SSZ-64, zeolite Beta, CIT-1, CIT-6, ITQ-4, and combinations thereof, and having a mole ratio of at least 10 of (a) an oxide of a first tetravalent element to (b) an oxide of a trivalent element, a pentavalent element, or a second tetravalent element which is different from said first tetravalent element or mixture thereof.

15. The process of claim 14, wherein oxides (1)(a) and (2)(a) are silicon oxide, and oxides (1)(b) and (2)(b) are independently selected from aluminum oxide, gallium oxide, iron oxide, boron oxide, titanium oxide, indium oxide, zinc oxide, magnesium oxide, cobalt oxide and mixtures thereof.

16. The process of claim 15, wherein oxides (1)(b) and (2)(b) are aluminum oxide.

17. The process of claim 15, wherein molecular sieve (1) is SSZ-39 and molecular sieve (2) is SSZ-26, SSZ-33, CIT-1, Beta, CIT-6 or mixtures thereof.

18. The process of claim 15, wherein molecular sieve (1), molecular sieve (2) or both contain a metal selected from Cu, Ag, Au or mixtures thereof.

19. The process of claim 15, wherein the engine is an internal combustion engine.

20. The process of claim 19 wherein the engine is fueled by a hydrocarbonaceous fuel.

21. The process of claim 15, wherein the molecular sieve has deposited on it a metal selected from the group consisting of platinum, palladium, rhodium, ruthenium, and mixtures thereof.

22. The process of claim 21, wherein the metal is platinum.

23. The process of claim 21, wherein the metal is palladium.

24. The process of claim 21, wherein the metal is a mixture of platinum and palladium.

25. The process of claim 14, wherein the cold-start engine exhaust gas stream is contacted with the small pore crystalline molecular sieve prior to contacting the crystalline molecular sieve having pores at least a large as 12 membered rings.

* * * * *